No. 673,511. Patented May 7, 1901.
F. H. BENNING.
DUST PAN.
(Application filed Nov. 19, 1900.)
(No Model.)
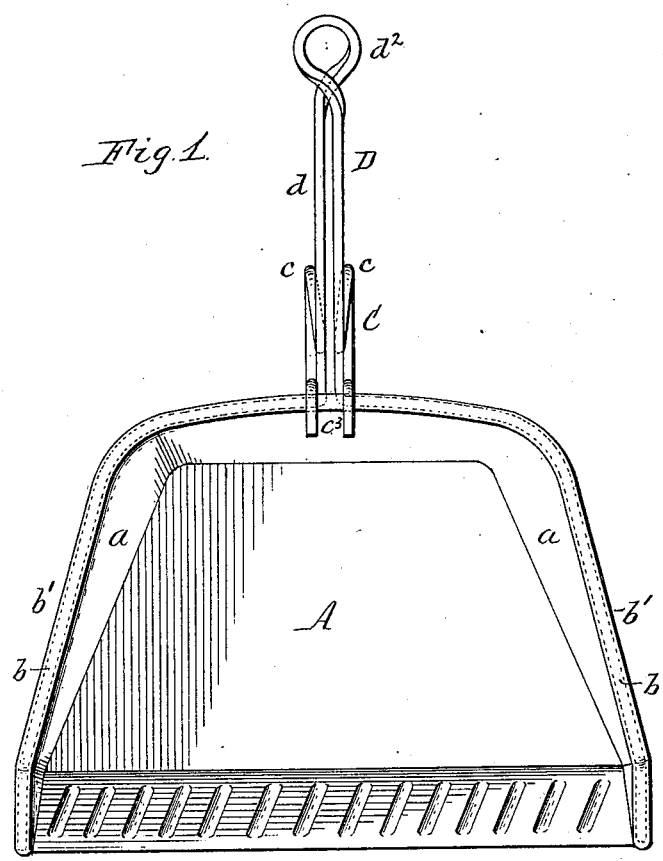
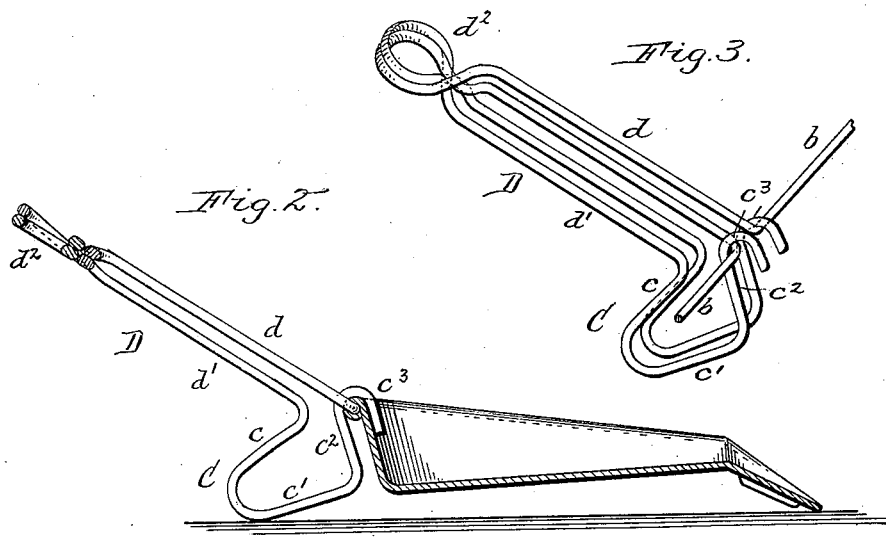
Witnesses
F. F. Schurzinger
E. A. Volk
Frank H. Benning Inventor
By Wilhelm Bonner Attorneys

UNITED STATES PATENT OFFICE.

FRANK H. BENNING, OF CHEEKTOWAGA, NEW YORK.

DUST-PAN.

SPECIFICATION forming part of Letters Patent No. 673,511, dated May 7, 1901.

Application filed November 19, 1900. Serial No. 36,940. (No model.)

*To all whom it may concern:*

Be it known that I, FRANK H. BENNING, a citizen of the United States, and a resident of Cheektowaga, in the county of Erie and State of New York, have invented a new and useful Improvement in Dust-Pans, of which the following is a specification.

This invention relates to dust-pans which are provided with a foot-loop for moving the pan along the floor without the necessity of stooping and pressing its front edge down upon the floor.

The object of my invention is to so connect the foot-loop with the pan that the same is practically an integral part thereof and not liable to be broken off.

In the accompanying drawings, Figure 1 is a top plan view of a dust-pan provided with my improvement. Fig. 2 is a transverse vertical section of the same. Fig. 3 is a detached perspective view of the handle and the foot-loop.

Like letters of reference refer to like parts in the several figures.

A is the body of the dust-pan, which has the usual marginal rim $a$ at its back and sides. This rim is stiffened or reinforced at its upper edge by wires $b\ b$, which are confined in a bead or fold $b'$. These wires extend from the front portion of the pan to the middle of its back.

C is a foot-loop arranged centrally at the back of the pan at right angles to its back rim, and D is a handle extending upwardly and backwardly from the pan and arranged above the foot-loop. This handle and the foot-loop are formed by branches or continuations of the reinforcing-wires $b$ of the pan. These branches extend upwardly and rearwardly from the back of the pan, as shown at $d$, and are then doubled forwardly nearly to the back of the pan, as shown at $d'$, thereby forming a double or loop-shaped handle. The branches are then bent downwardly and rearwardly, as shown at $c$, to form the upper and rear sides of the foot-loop C, thence forwardly, as shown at $c'$, to form the bottom of the foot-loop, and thence upwardly about at right angles to the bottom portions $c'$ to form the front bars $c^2$ of said loop. The members which form the front bars of the foot-loop terminate in hooks $c^3$, which embrace the back rim of the dust-pan. The rear end of the handle is preferably twisted to form an eye $d^2$, by which the pan may be hung from a nail or hook when not in use. By this construction each of the branches of the reinforcing-wires $b$ forms one-half of the handle and the foot-loop. The foot-loop is made of the proper size to receive the foot, and its rear portion extends below the bottom of the pan, as shown in Fig. 2, so that when the pan is placed upon the floor the front portion of its bottom is supported clear of the floor. In using the pan the foot is inserted in the loop C and the latter is depressed, thereby pressing the front edge of the pan against the floor or carpet and preventing the dust from being swept under the pan.

By forming the loop in one piece with the stiffening-wires of the pan the loop is reliably and securely fastened to the pan, and by forming the handle integral with the foot-loop the construction of these parts is correspondingly simplified and cheapened.

I claim as my invention—

1. A dust-pan having its rim provided with a reinforcing-wire which extends rearwardly and downwardly from the back rim of the pan and thence forwardly and upwardly, forming a foot-loop, and which terminates in a hook which embraces the back rim of the pan, substantially as set forth.

2. A dust-pan provided at the upper edge of its rim with reinforcing-wires having branches or continuations which meet at the middle of the back rim, each of said branches extending rearwardly and downwardly from the pan and thence forwardly and upwardly, forming a foot-loop, and terminating in hooks which embrace the back rim of the pan, substantially as set forth.

3. A dust-pan having a handle and a foot-loop and provided at the upper edge of its rim with reinforcing-wires having branches which meet at the middle of the back rim, each of said branches extending rearwardly and upwardly and then forwardly, to form said handle, thence downwardly and rearwardly to form the upper and rear bars of said foot-loop, thence forwardly to form the bottom bars of said loop and thence upwardly to form the front bars thereof, said front bars terminating in hooks which embrace the back rim of the pan, substantially as set forth.

Witness my hand this 8th day of November, 1900.

FRANK H. BENNING.

Witnesses:
CARL F. GEYER,
CYESTA HORNBECK.